United States Patent [19]
Stuck et al.

[11] 3,989,263
[45] Nov. 2, 1976

[54] SHOCK ABSORBING SEAT POST

[76] Inventors: Gregory A. Stuck; Albert C. Stuck, both of 3176 Fisher Ave., Bay City, Mich. 48706

[22] Filed: Mar. 17, 1975

[21] Appl. No.: 559,399

[52] U.S. Cl. ............................... 280/283; 248/401
[51] Int. Cl.² ........................................ B62K 19/36
[58] Field of Search ........... 280/283; 248/401, 402; 297/195, 208; 308/201

[56] References Cited
UNITED STATES PATENTS

| | | | |
|---|---|---|---|
| 584,944 | 6/1897 | Little | 248/401 |
| 664,184 | 12/1900 | Stoll | 280/283 |
| 2,562,679 | 7/1951 | Ort | 248/402 |
| 2,623,573 | 12/1952 | Gaetano | 280/283 |
| 3,469,894 | 9/1969 | Stamm | 308/201 |

FOREIGN PATENTS OR APPLICATIONS

| | | | |
|---|---|---|---|
| 421,323 | 10/1946 | Italy | 280/283 |

*Primary Examiner*—Robert R. Song
*Assistant Examiner*—Jack D. Rubenstein

[57] ABSTRACT

This invention relates to bicycle and tricycle seat posts and more particularly to shock-absorbing seat posts. This unique device, which fits in place of the conventional rigid seat post, supports the rider and absorbs all shock produced from traversing over small bumps, holes, etc., in the road. Another unique feature is that the seat is allowed to swing slightly from side to side, which not only produces a comforting effect, but also increases peddling efficiency.

2 Claims, 8 Drawing Figures

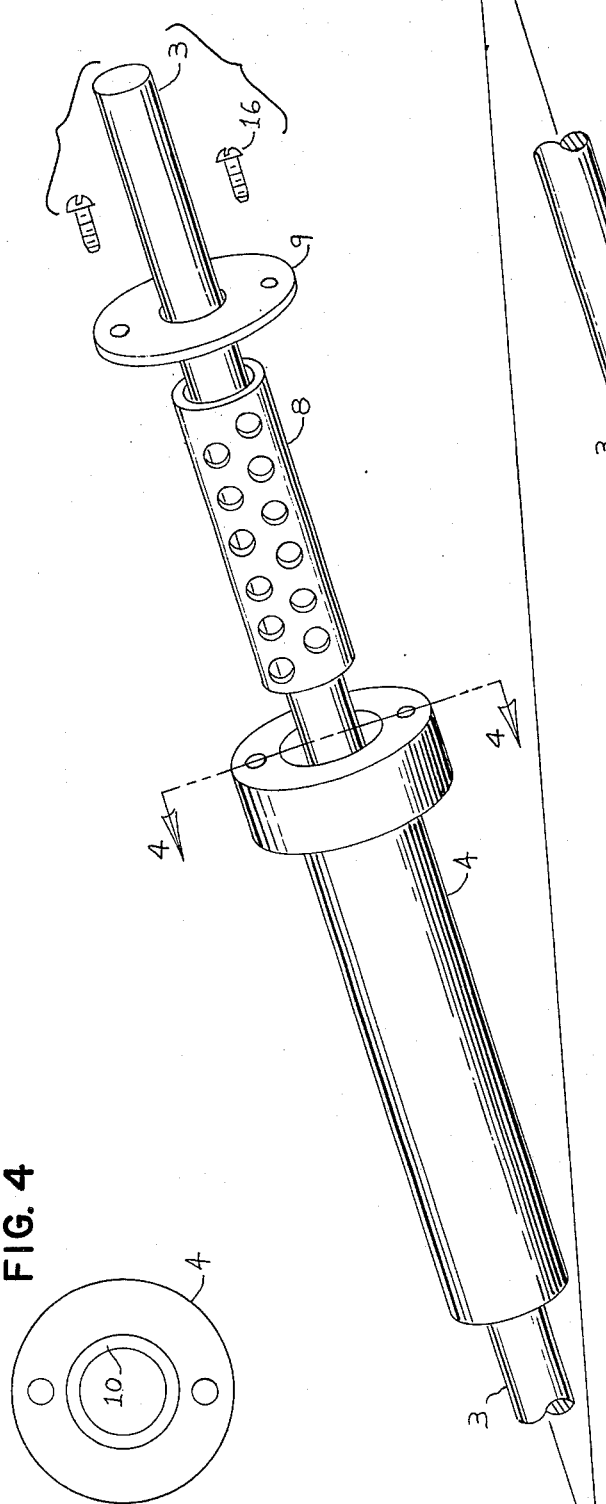
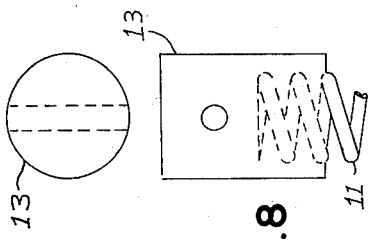
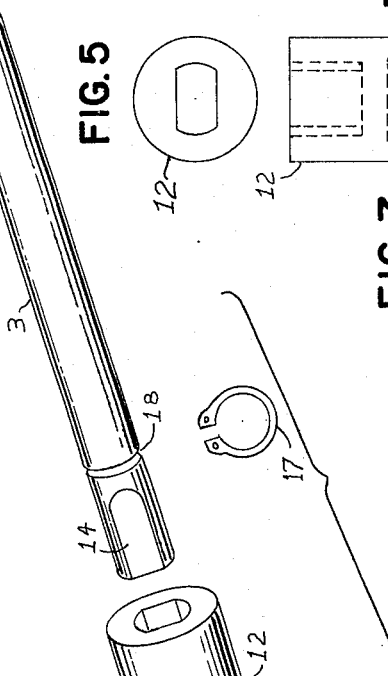
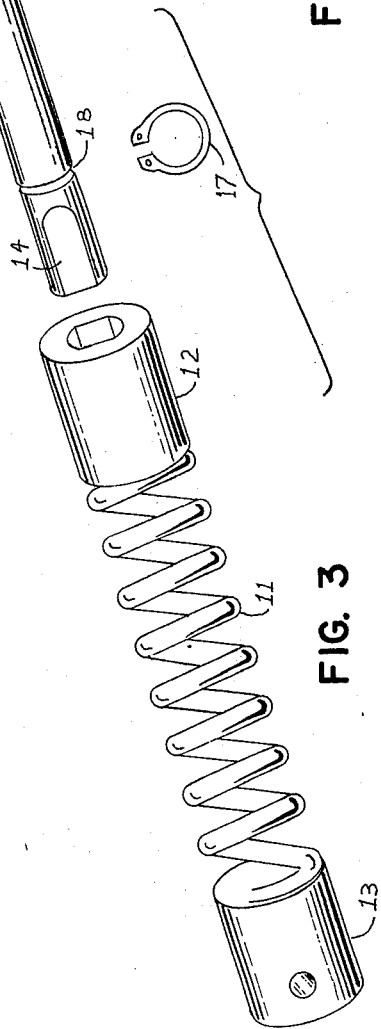
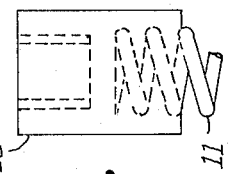

SHOCK ABSORBING SEAT POST

SUMMARY OF THE INVENTION

A helical spring contained within the tubular seatpost frame of the bicycle frame serves the purpose of absorbing shock and supporting the rider. A seat unit is provided, consisting of a rod connected to and extending downwardly from a seat. The rod is connected onto the seat which acts against this spring upon encountering a bump; the other end of the spring is supported by the frame, and thereby the rider is supported.

To guide the movement of this rod, it passes through a cylindrical, ball bearing retaining cage which in turn bears against a still larger cylinder—hereinafter called the 'outer-cylinder'. This outer-cylinder is then clamped into the seatpost frame the bicycle frame (in the space occupied by the conventional, rigid seat post), using the same clamp. This bearing arrangement insures a highly frictionless operation of the device, and it will thereby absorb shock even from the smallest of possible road disturbances. The seat can be adjusted to various heights depending upon the location of the spring support and the position at which the outer-cylinder is clamped into the frame (note that in the drawings the outer-cylinder has not been completely inserted into the bicycle frame).

Two methods are given for limiting the sideways motion thus stabilizing the position of the seat unit: (1) an internal means within the frame where the torsional resistance of the spring is employed, and (2) a curved, flat band fixed between the seat and the frame. One may be used with or without the other.

An object of this invention is to provide a continually acting, 'free-floating' seat support which would isolate the rider from any road shock or vibration, thus producing a more comfortable ride (hereinafter, the seat will be referred to as the 'saddle'). Another object of this invention is a provision that will allow a limited rotation of rider and saddle from side to side. This provides a gentle sideways, back and forth motion to the saddle when peddling. This action not only soothes the posterior and relieves the chafing on the inside of one's legs, but also increases peddling efficiency because the energy spent in rubbing one's leg against the saddle is now put directly on the pedals.

Other objects and a fuller understandng of this invention may be had by referrng to the following description and claims, taken in conjunction with the accompanying drawings in which:

BRIEF DESCRIPTION OF DRAWINGS

FIG. 3 is an exploded view of the device.

FIG. 4 is an end view of the outer cylinder taken on line 4—4 of FIG. 3.

FIGS. 5–8 shows details of the plugs moulded onto the ends of the spring.

SPECIFIC DESCRIPTION

Figure 2:
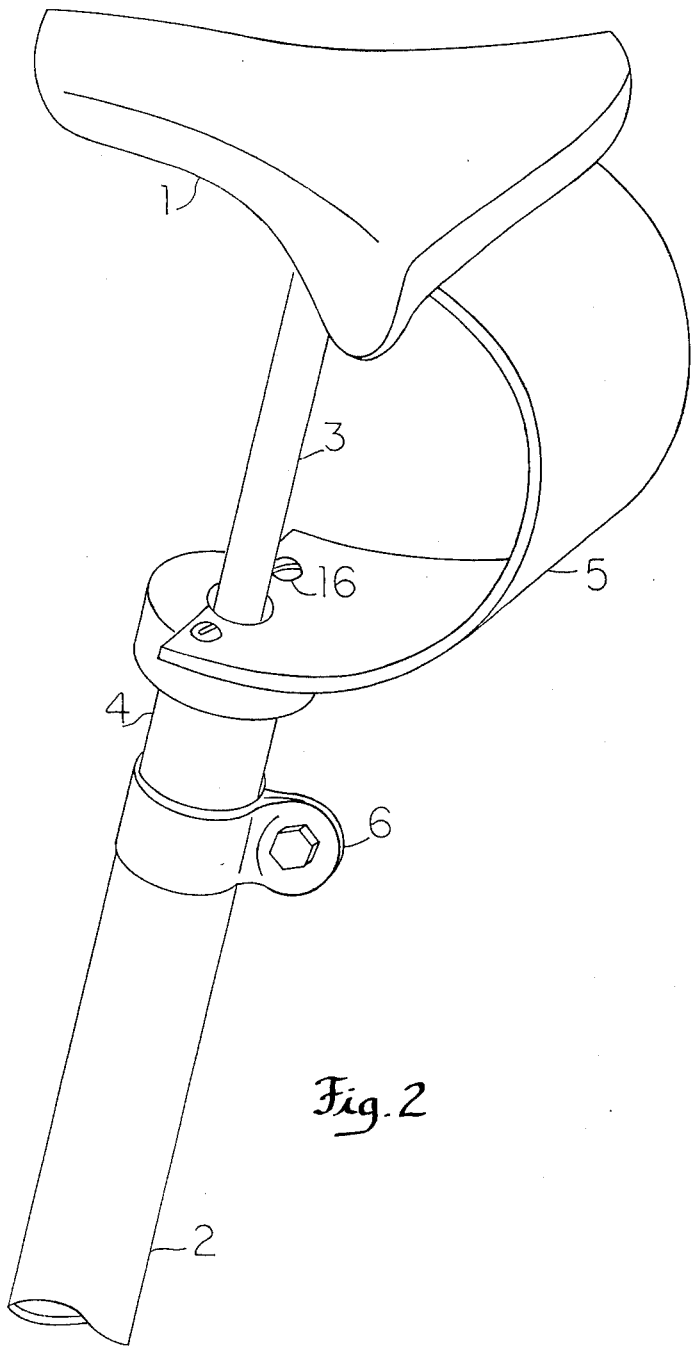
FIG. 2 is a view of the invention in conjunction with an existing bicycle frame and saddle.

With reference to FIG. 2 the device is shown in relation to the existing saddle and frame, indicated by the reference numerals 1 and 2 respectively. A seat unit is provided consisting of the seat or saddle 2 and a seat post rod 3 secured to and extending downwardly from the seat 2. The rod 3 is telescoped into the cylinder 4 for up and down movement therein. The saddle attaches to a seat post rod 3 which is then able to move up and down; the seat post rod moving in and out of the outer-cylinder 4 as bumps are encountered. The outer-cylinder is clamped into the bicycle frame (in the place occupied by the conventional rigid, tubular seat post), by means of the existing clamp 6. A flat band 5 acts as position stabilizing means for preventing rotation of the seat 2 and is shown attached to the outer-cylinder at its lower end and attached to the seat unit, specifically, the saddle at its upper end. The primary function of this flat band is to produce a restoring force which limits the rotation of the saddle as it is twisted from side to side and to keep the saddle pointed straight ahead when not in use. Due to the geometry of the flat band, it offers little resistance as the saddle moves up and down, yet becomes rather rigid when the saddle is rotated. This flat band should be of a tough and resilient material in order to withstand repeated flexures under various temperatures. By way of example, polypropolene was found to be very satisfactory, but there are no doubt other good plastics and also spring steel.

Figure 1:
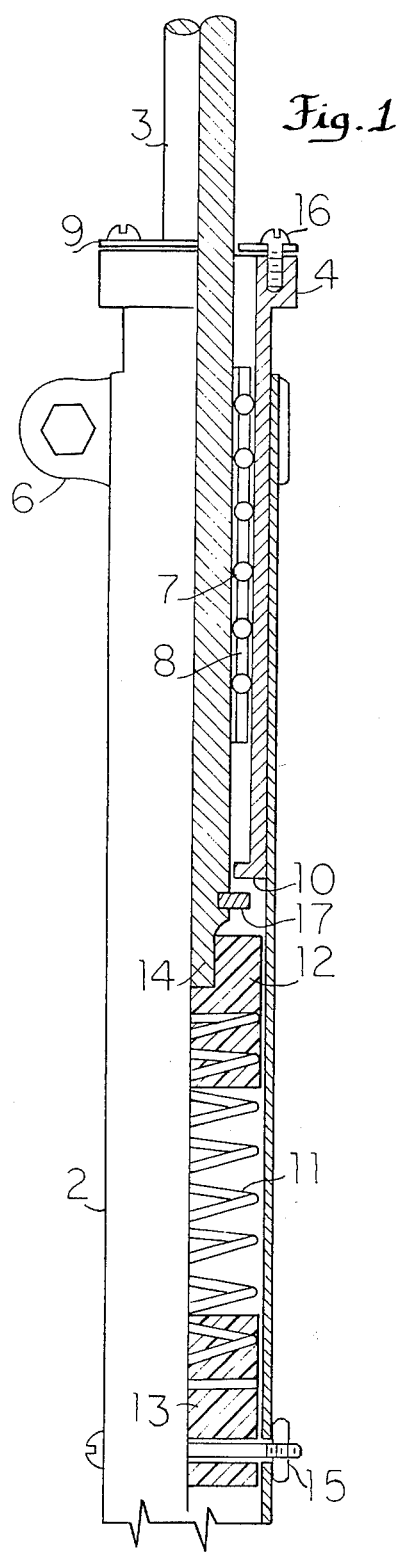
FIG. 1 is a half section, assembly view of a part of the invention as fitted into the tubing of a bicycle frame.

FIG. 1 shows how the various parts fit together within the bicycle frame. The upper portion of the figure depicts the ball bearings 7 between the seat post rod and outer-cylinder. These bearing surfaces should be hardened (preferably to about 60 Rockwell) and finished smooth to give durability and free-floating performance. It is desirable to provide lubrication, not only to improve performance but also to protect bearing surfaces from rust. The ball bearings are held in place by a retaining cage 8 which is a cylindrical shell or sleeve with holes in it so that the bearings can protrude from both sides (better illustrated in FIG. 3). A desirable feature is that the bearing unit retaining cage automatically positions itself to the central portion of the outer-cylinder when in operation, thereby leaving room for itself to travel relative to the seat post rod and outer-cylinder upon encountering a bump. The seat post rod acts against a helical spring 11 and compresses it as the saddle travels downward. Different stiffnesses should be used to match the weight of the individual rider and all springs should be of sufficient length and number of coils to give each rider a comfortable 'time' or frequency of bounce—not a short spring so as to give a small, jerky bounce (for this reason, it is preferable to design the flat band so that it will impart little resistance to the up and down motion of the saddle). When the rider mounts the bicycle he will depress the seat post rod and thereby compress the spring a certain distance—this will be called his equilibrium position (the aforementioned automatic positioning of the ball bearing retaining cage is independent of the equilibrium position of the seat post rod). Upon encountering a bump, the spring can still compress further and absorb the resulting shock. To illustrate the preceeding more clearly a typical example would be as follows: using a six inch long, rectangular wire spring with about 30 coils, the rider will depress the seat post rod about 1 inch when sitting on the saddle (this is the rider's equilibrium position); the rider may now depress the seat post rod another 1 to 1½ inches upon encountering a bump. The cylindrical plugs, 12 and 13, function as means for securing the spring 11 to the frame 2 and the rod 3 and are moulded onto the ends of the spring provide another mechanism for limiting the rotation of the saddle as it is twisted from side to side. These plugs are made of a tough, resilient material that will withstand repeated twisting. In actual use, polyethelene worked satisfactorily but there are many other materials which are much tougher that could also be used. The plug on the upper end of the spring 12 has a flat-sided socket which mates with the seat post rod having the same shape at its end 14 which allows the transmission of torsion (FIG. 5 shows the plugs in detail). The plug on the lower end of the spring 13 has a hole which allows the plug to be fastened securely to the bicycle frame, shown here by means of a screw and nut, which is indicated by the reference numeral 15. This spring now acts in the same manner as the aforementioned flat band, that is, as position stabilizing means and produces a restoring force which limits the rotation of the saddle.

The reason for presenting these two methods of limiting the rotation of the saddle is as follows: for a light rider, and hence a weaker spring, the spring will not be stiff enough in the rotational or torsional direction to adequately limit the rotation of the saddle. In this case the use of the flat band is called for. The opposite applies to heavy riders where strong springs are used. These springs are usually torsionally stiff enough to limit the rotation effectively and hence the flat band may be dispensed with. Either feature may be used independently or in conjunction of the other. The choice of design depending rather arbitrarily upon the tastes of the rider; the rotation can range from only a degree or so up to some practical limit such as 40° or 50° either side of the straight-ahead position of the saddle, when normal riding pressures are applied by the individual. However, it is preferable to limit the rotation to a degree somewhat midway between the above extremes. If only the flat band is to be used, then the moulded plugs are unnecessary and the spring is then allowed to butt against the screw and nut, and act only in compression.

The washer 9 on the top of the outer-cylinder and an internal ring or lip of material 10 at the bottom, present one means for constraining the ball bearing retaining cage. The washer is illustrated in FIG. 3 while the lip of material is better shown in FIGS. 4 and 1. An oiled, felt pad (not shown) in the same shape as 9 could also be positioned between the washer 9 and the outer-cylinder to keep out dirt and moisture. Two screws 16 are shown here as one means of clamping the washer to the outer-cylinder. Another operational feature is illustrated in FIS. 4 and 1: a ring 17 snapped into a groove 18 near the bottom of the seat post rod that will butt up against the bottom of the outer-cylinder 10 thus preventing the saddle and seat post rod from being withdrawn either accidentally or on purpose.

The means for performing the various functions as used herein are not limited to the detailed structures as illustrated in the drawings, as obvious variations may be employed. For example, the means for preventing the seat post rod from being withdrawn is not necessarily restricted to the ring 17 arrangement illustrated in the drawings, as such variations may be made that fall within the scope of the invention as claimed.

Although this invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. A shock absorbing seat assembly for use on a bicycle or the like, said assembly comprising an upright cylinder, a seat unit mounted on said cylinder and comprising a seat member and a rod secured to and extending downwardly from said seat member, said rod being telescoped within said cylinder for up and down movement therein, spring means in said cylinder engaged with said rod and urging said rod and said seat in an upward direction, bearing means supporting said rod in said cylinder during up and down movement of said rod in said cylinder, and position stabilizing means for said seat connected to and extending between said seat unit and said cylinder to prevent rotation of said seat unit relative to said cylinder wherein said position stabilizing means comprises a flat band member connected to and extending between said seat unit and said cylinder, said band member preventing rotation of said seat unit relative to said cylinder and offering minimal resistance to said up and down movement of said rod in said cylinder, and wherein said bearing means comprises a bearing unit having a sleeve with a plurality of holes formed therein, ball being rotatably mounted in each of said holes, said balls extending from said sleeve, said sleeve encircling said rod so that said balls engage said rod and said cylinder during up and down movement of said rod in said cylinder, and wherein said flat band member is flexed between said connections to provide said minimal resistance to the up and down movement of said rod in said cylinder and wherein said spring means is fixedly secured at its distal ends to said rod and to said cylinder, coacting with said flat band member to yieldably prevent rotation of said seat unit relative to said cylinder.

2. A shock absorbing seat assembly for use on a vehicle having a tubular seatpost frame such as a bicycle, said assembly comprising an upright cylinder adapted to be secured in said tubular seatpost frame, a seat unit mounted on said cylinder and comprising a seat member and a rod secured to and extending from said seat member, said rod being telescoped in said cylinder for up and down movement therein, spring means in said cylinder and urging said rod in an upward direction, bearing means supporting said rod in said cylinder during up and down movement of said rod in said cylinder, and position stabilizing means for said seat connected to and extending between said seat unit and said vehicle to prevent rotation of said seat unit relative to said vehicle wherein said spring means comprises a spring member having one end engaged with said seatpost frame and the other end engaged with said rod, and wherein said bearing means comprises a bearing unit encircling said rod, and wherein said seat positioning means comprises a flat band member connected to and extendng between said seat unit and said vehicle, said band member being flexed to offer minimal resistance to said up and down movement of said seat unit and further including means for fixedly securing one end of said spring member to seat post and fixedly securing the other end of said spring member to said rod so that said spring member coacts with said flat band member to prevent rotation of said seat unit relative to said vehicle.

* * * * *